(12) United States Patent
Ellis et al.

(10) Patent No.: US 6,905,989 B2
(45) Date of Patent: Jun. 14, 2005

(54) TUNABLE DIELECTRIC COMPOSITIONS INCLUDING LOW LOSS GLASS

(75) Inventors: Marion E. Ellis, Elkridge, MD (US); Steven Wesley Winn, Ellicott City, MD (US); Luna H. Chiu, Abingdon, MD (US)

(73) Assignee: Paratek Microwave, Inc., Columbia, MD (US)

(*) Notice: Subject to any disclaimer, the term of this patent is extended or adjusted under 35 U.S.C. 154(b) by 0 days.

(21) Appl. No.: 10/161,483

(22) Filed: May 31, 2002

(65) Prior Publication Data

US 2003/0073565 A1 Apr. 17, 2003

Related U.S. Application Data

(60) Provisional application No. 60/295,046, filed on Jun. 1, 2001.

(51) Int. Cl.$^7$ .............................................. C03C 14/00
(52) U.S. Cl. ...................... 501/32; 501/134; 501/135; 501/136; 501/137; 501/138; 501/139; 501/66; 501/67
(58) Field of Search .............................. 501/32, 65–67, 501/134–139

(56) References Cited

U.S. PATENT DOCUMENTS

| | | | |
|---|---|---|---|
| 3,582,729 A | | 6/1971 | Girard ........................ 317/258 |
| 4,392,180 A | * | 7/1983 | Nair .......................... 361/321.5 |
| 4,396,721 A | | 8/1983 | Lawless ........................ 501/10 |
| 4,490,429 A | * | 12/1984 | Tosaki et al. ................ 428/195 |
| 5,024,975 A | * | 6/1991 | Hartmann ..................... 501/65 |
| 5,084,424 A | * | 1/1992 | Abe et al. .................... 501/137 |
| 5,427,988 A | | 6/1995 | Sengupta et al. |
| 5,635,433 A | | 6/1997 | Sengupta et al. |
| 5,635,434 A | | 6/1997 | Sengupta et al. |
| 5,693,429 A | | 12/1997 | Sengupta et al. |
| 5,766,697 A | | 6/1998 | Sengupta et al. |
| 5,801,108 A | * | 9/1998 | Huang et al. ................. 501/32 |
| 5,830,591 A | | 11/1998 | Sengupta et al. |
| 5,846,893 A | | 12/1998 | Sengupta et al. |
| 6,074,971 A | | 6/2000 | Chiu et al. |
| 6,171,988 B1 | | 1/2001 | Fasano et al. ................ 501/72 |

FOREIGN PATENT DOCUMENTS

DE        42 15 638 A        11/1992

OTHER PUBLICATIONS

Derewent Abstract 1992–391174, abstract of DE 4215638 A.*
U.S. Appl. No. 09/594,837, filed Jun. 15, 2000, Chiu et al., Entitled "Electronically Tunable Ceramic Materials Including Tunable Dielectric and Metal Silicate Phases".
U.S. Appl. No. 09/768,690, filed Jan. 24, 2001, Sengupta et al., Entitled "Electronically Tunable, Low–Loss Ceramic Materials Including a Tunable Dielectric Phase and Multiple Metal Oxide Phases".
PCT International Search Report for International Application No. PCT/US02/17194 dated Oct. 7, 2002.

* cited by examiner

Primary Examiner—David Sample
Assistant Examiner—Elizabeth A. Bolden
(74) Attorney, Agent, or Firm—Alan G. Towner; Michael N. Haynes; James S. Finn

(57) ABSTRACT

Tunable dielectric materials including an electronically tunable dielectric ceramic and a low loss glass additive are disclosed. The tunable dielectric may comprise a ferroelectric perskovite material such as barium strontium titanate. The glass additive may comprise boron, barium, calcium, lithium, manganese, silicon, zinc and/or aluminum-containing glasses having dielectric losses of less than 0.003 at 2 GHz. The materials may further include other additives such as non-tunable metal oxides and silicates. The low loss glass additive enables the materials to be sintered at relatively low temperatures while providing improved properties such as low microwave losses and high breakdown strengths.

31 Claims, 2 Drawing Sheets

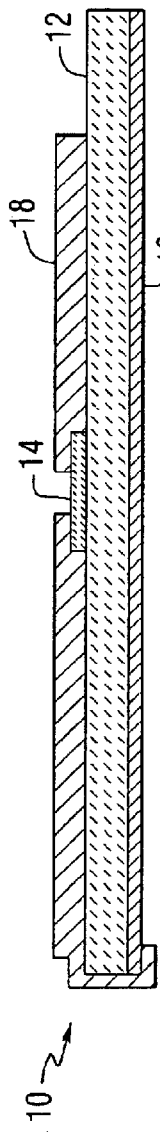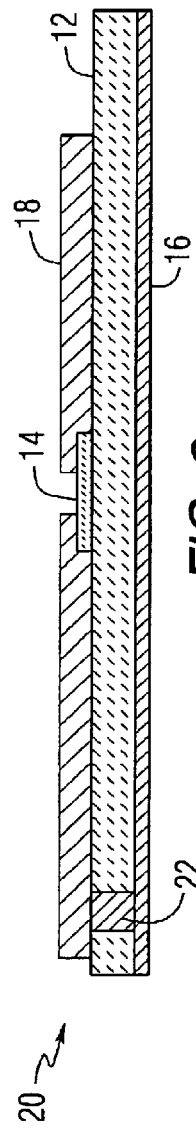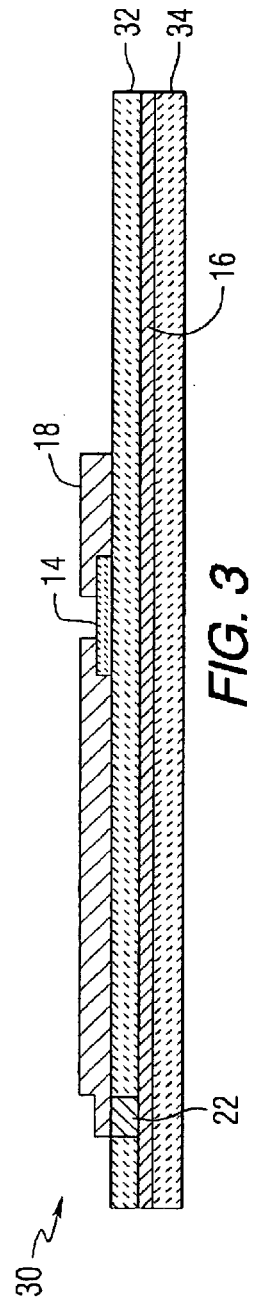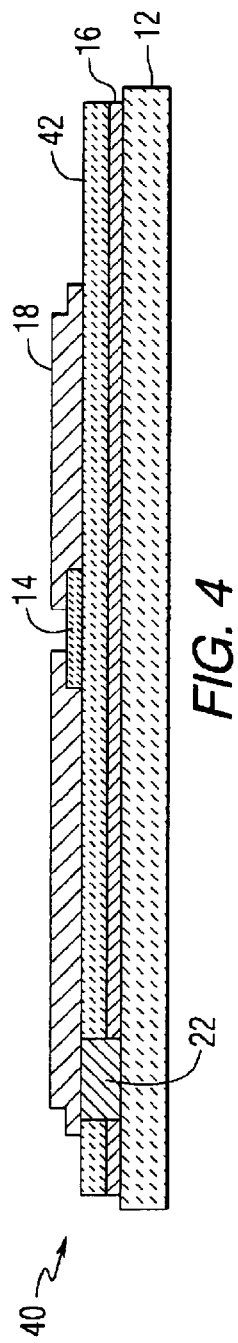

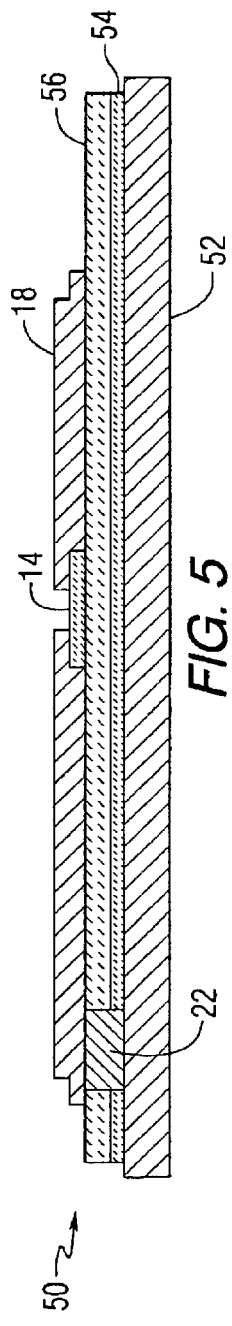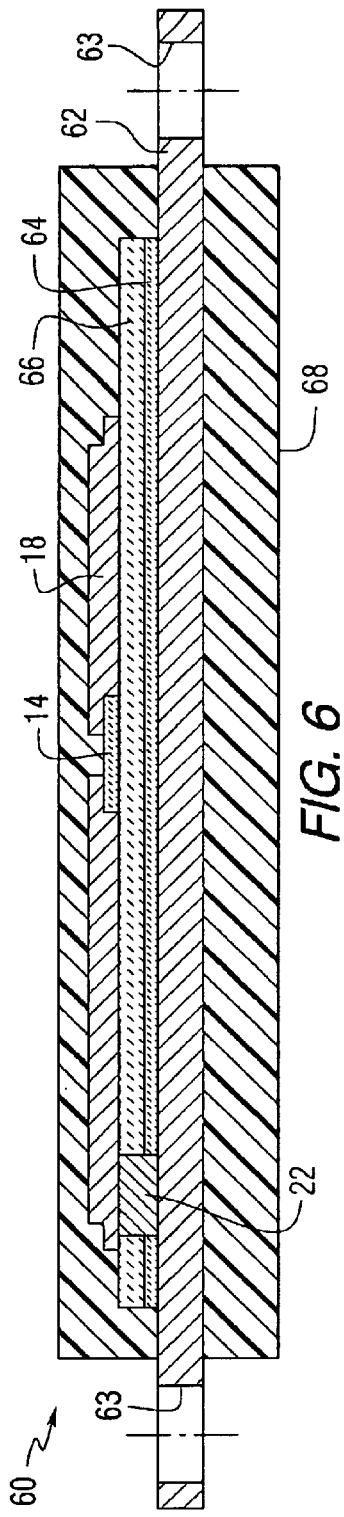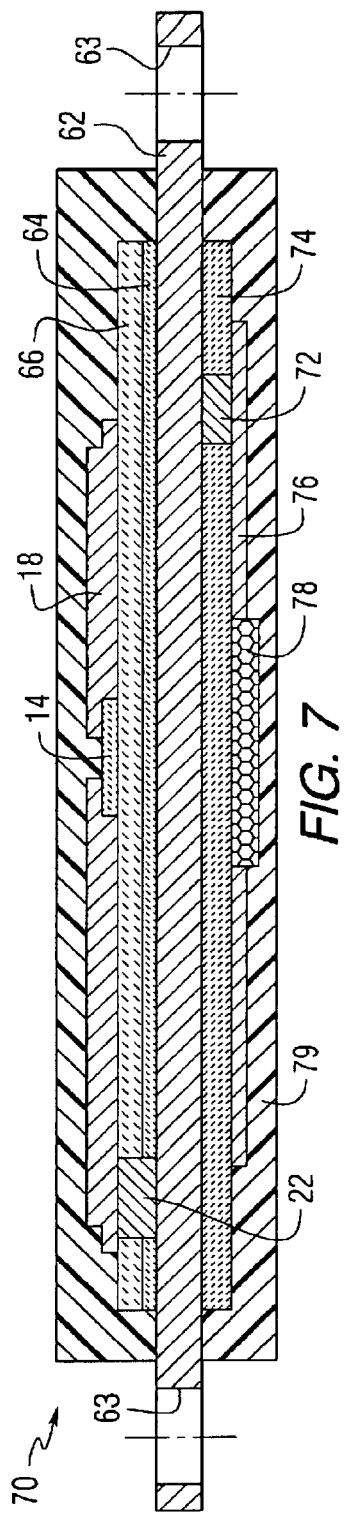

TUNABLE DIELECTRIC COMPOSITIONS INCLUDING LOW LOSS GLASS

CROSS-REFERENCE TO RELATED APPLICATION

This application claims the benefit of U.S. Provisional Patent Application Ser. No. 60/295,046 filed Jun. 1, 2001.

FIELD OF THE INVENTION

The present invention relates to tunable dielectric materials, and more particularly relates to materials comprising an electronically tunable ceramic and a low loss glass additive.

BACKGROUND INFORMATION

Microwave devices such as electronically scanning antennas, phased array antennas, electronic down tilt antennas, electronically tunable filters, electronically tunable radar and tunable oscillators have been proposed for use, but their high costs have prevented widespread commercial implementation. The existence of low cost tuning technology would revolutionize the industry of microwave components and antennas.

Barium titanate is a known ceramic material that is tunable at room temperature. Another known tunable ceramic is strontium titanate. However, this material by itself must be super cooled in order to have usable tuning characteristics. Other tunable dielectrics include lead zirconium titanates (PZT), lead lanthanum zirconium titanates (PLZT), $PbTiO_3$, $KNbO_3$, $LaTaO_3$, $BaCaZrTiO_3$, $NaNO_3$ and other ferroelectric perovskites. The problem with these known ferroelectrics is that their losses are very high at room temperature. This makes these materials essentially useless at microwave frequencies. One way to combat this problem would be to produce a low loss but still tunable material with reasonable dielectric constants.

Barium strontium titanate (BSTO) has been used for its high dielectric constant, on the order of 200 to 6,000, and its large change in dielectric constant with applied voltage, on the order of 25 to 75 percent at a field of 2V/micron. Dielectric materials including barium strontium titanate are disclosed in U.S. Pat. No. 5,427,988 to Sengupta, et al. entitled "Ceramic Ferroelectric Composite Material-BSTO—MgO"; U.S. Pat. No. 5,635,434 to Sengupta, et al. entitled "Ceramic Ferroelectric Composite Material-BSTO-Magnesium Based Compound"; U.S. Pat. No. 5,830,591 to Sengupta, et al. entitled "Multilayered Ferroelectric Composite Waveguides"; U.S. Pat. No. 5,846,893 to Sengupta, et al. entitled "Thin Film Ferroelectric Composites and Method of Making"; U.S. Pat. No. 5,766,697 to Sengupta, et al. entitled "Method of Making Thin Film Composites"; U.S. Pat. No. 5,693,429 to Sengupta, et al. entitled "Electronically Graded Multilayer Ferroelectric Composites"; U.S. Pat. No. 5,635,433 to Sengupta entitled "Ceramic Ferroelectric Composite Material BSTO—ZnO"; U.S. Pat. No. 6,074,971 to Chiu et al. entitled "Ceramic Ferroelectric Composite Materials with Enhanced Electronic Properties BSTO—Mg Based Compound-Rare Earth Oxide"; U.S. application Ser. No. 09/594,837 filed Jun. 15, 2000, entitled "Electronically Tunable Ceramic Materials Including Tunable Dielectric and Metal Silicate Phases" and U.S. application Ser. No. 09/768,690 filed Jan. 24, 2001 entitled "Electronically Tunable, Low-Loss Ceramic Materials Including a Tunable Dielectric Phase and Multiple Metal Oxide Phases". These patents and applications are incorporated herein by reference.

The foregoing materials are highly advantageous for microwave component designs because their tuning characteristics allow for the devices to have variable properties. Such variable properties allow for new designs, e.g., for filters which can vary the frequency of operation and for antennas to scan and track satellites electronically, and allow for frequency-hopping of microwave devices as well as many other applications. Such materials can be readily used in a wide range of frequencies, e.g., from 100 kHz to 60 GHz. Since the preferred materials require voltage changes in order to switch, very low current and power requirements are achieved. The materials are produced by firing or sintering at temperatures on the order of 1,300° C.

There is a need for tunable dielectric materials that can be fired or sintered at relatively low temperatures, thereby permitting the use of standard thick film substrate materials, such as alumina, and relatively inexpensive noble metal metallization inks. The present invention has been developed in view of the foregoing.

SUMMARY OF THE INVENTION

The present invention relates to tunable dielectric materials comprising an electronically tunable ceramic and a low loss glass additive. The electronically tunable materials are advantageous in that they are homogeneous, extremely dense, can be deposited in large areas, and possess superior electronic properties, such as improved breakdown strengths, at both dc voltages and at microwave operating frequencies. The materials may be produced by sintering at relatively low temperatures, e.g., less than about 1,300° C. or 1,200° C., preferably less than 1,100° C.

The invention also relates to methods for forming tunable capacitive devices from the tunable dielectric materials at relatively low sintering temperatures compared to the current state of the art. The electronically tunable materials may be deposited on a variety of low cost ceramic substrates using standard thick film processing techniques.

The present tunable materials may be made in various forms for electronic devices, such as bulk ceramics, thick films and thin films. Methods for producing these materials may comprise powder metallurgy techniques, injection molding, hydrostatic pressing, tape casting, roll compaction, screen printing, electro plating, MOCVD, spin coating, laser deposition, vacuum deposition, and the like. The materials exhibit decreased sintering temperatures thereby enabling a greater variety of processing techniques to be used. This also allows for the material to be compatible with most standard thick film materials such as high alumina substrates, and noble metal metallization inks.

The materials exhibit desired electronic properties for microwave devices. The properties include low losses and high tunability. Also, lower dielectric constants can be achieved with the present glass-containing materials while maintaining tunability and low losses. The materials have increased temperature stability, increased lifetimes, improved surface roughness and microstuctural uniformity. Due to the decreased sintering temperatures, the present materials can readily be integrated into vertical structures which allow for reduced voltages used to tune the materials. Decreased sintering temperature also allows for easier assimilation of these materials into integrated devices. Multilayered devices with other ceramics can be achieved with thicknesses ranging from 0.5 to 50 mils.

An aspect of the present invention is to provide a tunable dielectric material comprising a tunable dielectric ceramic and a low loss glass additive.

Another aspect of the present invention is to provide a tunable device comprising a substrate and a tunable dielectric material deposited on the substrate. The tunable dielectric material comprises a low loss glass additive.

A further aspect of the present invention is to provide a method of making a tunable dielectric material. The method comprises the steps of depositing a tunable dielectric material comprising a low loss glass additive on a substrate, and sintering the material.

These and other aspects of the present invention will be more apparent from the following description.

DESCRIPTION OF THE DRAWINGS

FIG. 1 is a side sectional view illustrating a tunable varactor thin film gold edge-around to backside groundplane including a tunable dielectric material in accordance with an embodiment of the present invention.

FIG. 2 is a side sectional view illustrating a tunable varactor thick film via to thick film backside groundplane including a tunable dielectric material in accordance with an embodiment of the present invention.

FIG. 3 is a side sectional view illustrating a tunable varactor on low loss LTCC with integral groundplane including a tunable dielectric material in accordance with an embodiment of the present invention.

FIG. 4 is a side sectional view illustrating a tunable varactor with integral groundplane including a tunable dielectric material in accordance with an embodiment of the present invention.

FIG. 5 is a side sectional view illustrating a tunable varactor on a stainless steel substrate and groundplane including a tunable dielectric material in accordance with an embodiment of the present invention.

FIG. 6 is a side sectional view illustrating a robust overmolded tunable varactor on a stainless steel substrate including a tunable dielectric material in accordance with an embodiment of the present invention.

FIG. 7 is a side sectional view illustrating a robus overmolded two-sided package on a stainless steel substrate including a tunable dielectric material in accordance with an embodiment of the present invention.

DETAILED DESCRIPTION

The present invention provides electronically tunable materials comprising an electronically tunable ceramic and a low loss glass additive. The materials may also include additional additives, such as metal silicates, metal oxides and/or metal titanates. The materials have microwave properties that can be used for building RF components, devices and antennas. The materials have very low microwave loses in comparison with conventional materials.

An embodiment of the invention provides a combination of low loss glass frits with dielectric powders in such a way that tunable capacitive devices can be formed onto low cost substrates, such as high alumina substrates, at temperatures well within their fireability range, e.g., less than 1,300 or 1,200° C. For example, the present materials may be sintered at temperatures ranging from about 850° C. or 900° C. to about 1,000° C. or 1,100° C. In addition, the presence of the glass additive may significantly increase the life of such devices. For example, when subjected to elevated temperature and voltage, the life of a device may be increased significantly. The present tunable materials also possess increased temperature stability compared with conventional materials.

The present tunable materials can be provided in various forms such as pressed bulk dielectrics, printable thick film inks and low temperature co-fireable ceramic dielectric tapes consistent with the class of materials known as low temperature cofired ceramics (LTCC). Various thicknesses may be provided. In one embodiment, the film is relatively thin, e.g., from 0.005 to 0.025 mm. In another embodiment, the film has an intermediate thickness, e.g., from 0.025 to 0.5 mm. In a further embodiment, the film is relatively thick, e.g., from 0.5 to 2 mm.

The present electronically tunable materials preferably comprise a barium strontium titanate ($BaTiO_3$—$SrTiO_3$) electronically tunable powder. For example, the barium strontium titanate may be of the formula $Ba_xSr_{1-x}TiO_3$, where x is from about 0.3 to about 0.7. However, other electronically tunable dielectric powders may be used partially or entirely in place of barium strontium titanate. An example is $Ba_xCa_{1-x}TiO_3$, where x is from about 0.2 to about 0.8, preferably from about 0.4 to about 0.6. Additional electronically tunable ferroelectrics include $Pb_xZr_{1-x}TiO_3$ (PZT) where x ranges from about 0.05 to about 0.4, lead lanthanum zirconium titanate (PLZT), $PbTiO_3$, $BaCaZrTiO_3$, $NaNO_3$, $KNbO_3$, $LiNbO_3$, $LiTaO_3$, $PbNb_2O_6$, $PbTa_2O_6$, $KSr(NbO_3)$ and $NaBa_2(NbO_3)5KH_2PO_4$.

The electronically tunable materials may also include at least one non-tunable dielectric powder. The additional non-tunable dielectric powder(s) may include MgO, $MgAl_2O_4$, $MgTiO_3$, $Mg_2SiO_4$, $CaSiO_3$, $MgSrZrTiO_6$, $CaTiO_3$, $Al_2O_3$, $SiO_2$ and/or other metal silicates such as $BaSiO_3$ and $SrSiO_3$. The non-tunable dielectric powders may be any combination of the above, e.g., MgO combined with $MgTiO_3$, MgO combined with $MgSrZrTiO_6$, MgO combined with $Mg_2SiO_4$, MgO combined with $Mg_2SiO_4$, $Mg_2SiO_4$ combined with $CaTiO_3$, and the like.

Preferred tunable materials of the present invention comprise $Ba_xSr_{1-x}TiO_3$, where x is from 0.3 to 0.7 in combination with at least one non-tunable dielectric powder selected from MgO, $MgTiO_3$, $MgZrO_3$, $MgSrZrTiO_6$, $Mg_2SiO_4$, $CaSiO_3$, $MgAl_2O_4$, $CaTiO_3$, $2MgO$, $2Al_2O_3$, $5SiO_2$, $BaSiO_3$ and $SrSiO_3$. These compositions can be BSTO and one of these components or two or more of these components in quantities from 0.25 weight percent to 80 weight percent with BSTO weight ratios of 20 weight percent to 99.75 weight percent. A typical composition may be $Ba_{0.55}Sr_{0.45}TiO_3$ (56 weight percent) and $MgTiO_3$ (24 weight percent) and MgO (20 weight percent).

In accordance with the present invention, the electronically tunable materials include at least one glass additive. The glass additive preferably comprises a low loss glass frit in an amount up to about 50 or 60 weight percent of the material. The glass frit typically comprises from about 0.1 to about 25 weight percent of the tunable material, more typically from about 0.5 to about 15 weight percent. In one embodiment, the low loss glass comprises at least about 2 or 3 weight percent of the material.

As used herein, the term "loss" means microwave energy dissipation. The term "low loss glass" means a glass composition which exhibits a relatively low dielectric loss, e.g., less than 0.003, preferably less than 0.001, at a frequency of about 2 GHz. Suitable low loss glasses include, for example, boron, barium, calcium, lithium, manganese, silicon, zinc and/or aluminum-containing glasses. Suitable boron-containing glasses may include at least one additional element selected from Si, Al, Li, Na, K, Ba, Zn, Mn and Ca. For example, some types of borosilicate glass may be suitable. Suitable calcium-containing glasses may include at least one additional element selected from B, Al, Si, Ba, Zn, Li, Mn and Sr. Suitable aluminum-containing glasses may include at least one additional element selected from Si, B, Li, Na, K, Ba, Zn, Mn, Ca, Sr and Mg. Table 1 lists some suitable low loss glass frit compositions.

TABLE 1

Low Loss Glass Frit Compositions

| Glass # | Glass Compositions |
|---|---|
| 1 | Si—B—Al—Li—Na—K—Ba |
| 2 | Si—B—K—Al—Li—Na |
| 3 | Si—Ba—B—Al |
| 4 | Si—B—Al—K—Na—Li |
| 5 | B—Ba—Zn—Li—Mn—Ca—Al |
| 6 | B—Ba—Zn—Si—Li—Mn—Ca—Al |
| 7 | B—Ca—Sr—Mg—Si—Al |
| 8 | B—Bi—Zn—Ba—Si |
| 9 | B—Bi—Zn—Si—Ba—Li—Al |
| 10 | B—Bi—Zn—Si—Al |
| 11 | Ca—B—Al—Si |
| 12 | Zn—B—Si |

Additional minor additives in amounts of from about 0.1 to about 5 weight percent can be added to the materials to additionally improve the electronic properties of the films. These minor additives include oxides such as zirconnates, stannates, rare earths, niobates and tantalates. For example, the minor additives may include $CaZrO_3$, $BaZrO_3$, $SrZrO_3$, $BaSnO_3$, $CaSnO_3$, $MgSnO_3$, $Bi_2O_3/2SnO_2$, $Nd_2O_3$, $Pr_7O_{11}$, $Yb_2O_3$, $Ho_2O_3$, $La_2O_3$, $MgNb_2O_6$, $SrNb_2O_6$, $BaNb_2O_6$, $MgTa_2O_6$, $BaTa_2O_6$ and $Ta_2O_3$.

The electronically tunable materials are preferably made from particles of the tunable powder and glass frit having controlled particle sizes. Particle sizes of from about 0.2 to about 5 microns are preferred, more preferably from about 0.2 to about 2 microns. The particle size of the electronically tunable powders does not have to be the same size as the glass frit or non-tunable powders.

The present tunable materials exhibit favorable electronic and physical properties, As used herein, the term "electronically tunable material" means a material that exhibits a variable dielectric constant upon the application of a variable voltage and/or current. The term "voltage tunable material" as used herein means a material that exhibits a variable dielectric constant with a variable applied voltage. The term "breakdown strength" means the maximum voltage achievable before leakage or catastrophic failure occurs. The term "improved breakdown strength" means that the breakdown strength of the present tunable material is substantially higher than the breakdown strength of the same material without the low loss glass additive, e.g., the maximum voltage achievable before leakage of catastrophic failure occurs is at least 10 percent or 20 percent higher for the present tunable materials compared with the same material without the low loss glass additive. The tunable material preferably exhibits a breakdown strength of at least about 80 V/micron thickness.

The dielectric constant or permittivity of at material is a complex quantity defined as $\in = \in' - i\in$. It is a measure of the amount of charge that can be stored in a material. In general for most applications dielectric constants should be in the range of 10 to 1,500. A lower dielectric constant may be preferable for waveguides so that impedance matching is easier. However, in some co-planar devices such as varactors or delay lines, higher dielectric constant materials yield reasonable sizes for lines and spacings.

The loss tangent is a measure of the dissipation of microwave energy in a device and can be defined as $\in''/\in'$. A low loss tangent is typically the desirable characteristic. Depending on the frequency of an application, usable loss tangents are typically below 0.08. Preferably, the loss tangents of the present materials are less than 0.025. If low loss tangent at high microwave frequencies can be achieved, there is no need for active amplification of signals, and the cost and complexity of a particular device may be significantly reduced.

The tunability of a material is a measure of how much the dielectric constant changes with applied voltage. High tunability is desirable for most applications. For example, in the case of waveguides, higher tunability will allow for shorter pieces which results in a lower insertion loss in the overall device. Higher tunability will result in a large angle of sweep at lower operation voltages. The tunability can be calculated as follows: % tunability=$[(X-Y)/(X)] \times 100$ where X is the dielectric constant at zero voltage and Y is the dielectric constant at a specific applied voltage. The materials of the present invention typically have tunabilities of at least 15 percent, preferably at least 25 percent.

In accordance with an embodiment of the invention, the tunability of films of the material, e.g., under an applied electric field of 2.0 V/micron, preferably ranges from about 1 to about 60 percent, more preferably from about 5 to about 30 percent, depending on the composition of the film employed and the gap size of the metallization utilized in the device.

The tunable materials of the present invention possess very low microwave losses. For example, the present materials may have microwave loss of less than 0.08, preferably less than 0.02, at a microwave frequency of 2 GHz.

To prepare the present electronically tunable materials, powder forms of the tunable material(s) or their precursors (such as $BaTiO_3$ and $SrTiO_3$ or $CaTiO_3$ and $SrTiO_3$ for example), may optionally be combined with additive oxide(s) and mixed to form the desired stoichiometry. The powders may be ball-milled in a solvent such as water or ethanol using alumina or zirconia grinding media for a suitable time, e.g., 24 hours. The resulting mixture may be air-dried to evaporate the solvent. The powders may then be calcined to form the desired compound. Calcination temperatures are typically about 1,200° C. or higher. The sintering temperature of the ceramics may be determined by iteratively firing the parts until the maximum density is achieved.

After calcination of the tunable material(s), the resulting compound may then be mixed with the glass additive(s), the optional non-tunable powder(s), and any desired dopants, e.g., using the same method as described above. After air-drying the powders, the resulting mixture may be blended with a polymeric binder. Suitable vehicles include a solvent such as acetate, xylene or ethanol, a binder such as acrylic, vinyl or ester, and a medium such as cellulose, resin or glycol. The percentage of binder to ceramic powders depends on the density and particle size of the ceramic powder, preferably from about 60 to about 80 weight percent ceramic powder and from about 20 to about 40 weight percent binder. For example, a typical mixture may be 70 grams of ceramic and 30 grams of binder. The mixture can be milled in an attritor mill or a three roll mill to achieve proper consistency. The resultant slurry can be deposited on a substrate by techniques such as screen printing, spraying and the like. The deposited film may then be sintered at temperatures of less than 1,300 or 1,200° C., preferably less than 1,100° C., for a time of from about 1 to about 4 hours. In a preferred embodiment, the tunable material film is sintered at a temperature of from about 850° C. or 900° C. to about 1,000° C. for a time of from about 0.25 to about 4 hours.

The following examples illustrate various aspects of the present invention, and are not intended to limit the scope of the invention. Some compositions of tunable dielectric ceramic powders are listed in Table 2.

TABLE 2

Compositions of Tunable Dielectric Powders

| Composition | Mole % $Ba_xTiO_3$ | Mole % $Sr_{(1-x)}TiO_3$ | Weight % $2MgOSiO_2$ | Weight % $CaTiO_3$ | Weight % $MgTiO_3$ |
|---|---|---|---|---|---|
| A | 45 | 55 | 10 | 0 | 0 |
| B | 50 | 50 | 10 | 0 | 0 |
| C | 50 | 50 | 20 | 0 | 0 |
| D | 55 | 45 | 10 | 0 | 0 |
| E | 55 | 45 | 20 | 0 | 0 |
| F | 60 | 40 | 20 | 0 | 0 |
| G | 55 | 45 | 20 | 8 | 0 |
| H | 50 | 50 | 40 | 6 | 0 |
| I | 50 | 50 | 0 | 0 | 0.1 |
| J | 50 | 50 | 0 | 0 | 0.5 |
| K | 55 | 45 | 0 | 0 | 5 |

TABLE 2-continued

Compositions of Tunable Dielectric Powders

| Composition | Weight % $BaTiO_3$ | $SrTiO_3$ | $2MgOSiO_2$ | $CaTiO_3$ | $MgTiO_3$ |
|---|---|---|---|---|---|
| A | 45.88 | 44.12 | 10 | 0 | 0 |
| B | 50.36 | 39.64 | 10 | 0 | 0 |
| C | 44.77 | 35.23 | 20 | 0 | 0 |
| D | 54.76 | 35.24 | 10 | 0 | 0 |
| E | 48.67 | 31.33 | 20 | 0 | 0 |
| F | 52.47 | 27.53 | 20 | 0 | 0 |
| G | 43.80 | 28.20 | 20 | 8 | 0 |
| H | 30.22 | 23.78 | 40 | 6 | 0 |
| I | 55.90 | 44.00 | 0 | 0 | 0.1 |
| J | 55.68 | 43.82 | 0 | 0 | 0.5 |
| K | 57.80 | 37.20 | 0 | 0 | 5 |

The percentages listed in the following tables are weight percentages unless otherwise indicated. Samples having the compositions shown in Table 3 were sintered and tested as shown in Table 4.

TABLE 3

Compositions

| Composition | Example 1 | Example 2 | Example 3 | Example 4 | Example 5 | Example 6 | Comparative Example |
|---|---|---|---|---|---|---|---|
| Low Dielectric Loss Glass #4 | 1% | 3% | 5% | 0% | 0% | 0% | 0% |
| Low Dielectric Loss Glass #7 | 0% | 0% | 0% | 1% | 3% | 5% | 0% |
| Dielectric Powder F | 99% | 97% | 95% | 99% | 97% | 95% | 100% |
| Total | 100% | 100% | 100% | 100% | 100% | 100% | 100% |

TABLE 4

Sintering Temperature and Properties

| | Example 1 | Example 2 | Example 3 | Example 4 | Example 5 | Example 6 | Comparative Example |
|---|---|---|---|---|---|---|---|
| Peak Sintering Temperature ° C. | 1100 | 1100 | 1100 | 1100 | 1100 | 1100 | 1300 |
| 1 Mz K | 287 | 321 | 228 | 265 | 272 | 217 | 213 |
| 1 Mz df | 0.002 | 0.001 | 0.001 | 0.001 | 0.001 | 0.001 | 0.002 |
| % Tuning 4 V/um Thickness | 31 | 28 | 23 | 31 | 33 | 29 | 41 |
| Micro Amps Leakage 8 V/um Thickness | 3 after 45 hours | 3 after 45 hours | 3 after 45 hours | 0 after 50 hours | 2 after 50 hours | 1 after 50 hours | short <10 sec |

The tunable dielectric material composition comprising the low dielectric loss glass additive and dielectric powder as shown in Example 1 of Table 3 was pressed into a 1 inch diameter cylinder about 0.3 inch in height and sintered in a firing cycle of about 30 hours with a peak temperature of 1,100° C. and then machined to a uniform height of about 0.15 inch. The resultant dielectric material has a dielectric constant of about 287, a dissipation factor of about 0.002, and exhibited tuning of about 31%, while exhibiting leakage of no more than about 3 micro amps after 45 hrs, as shown in Table 4.

The tunable dielectric material composition comprising the low dielectric loss glass additive and dielectric powder as shown in Example 2 of Table 3 was pressed into a 1 inch diameter cylinder about 0.3 inch in height and sintered in a firing cycle of about 30 hours with a peak temperature of 1,100° C. and then machined to a uniform height of about 0.15 inch. The resultant dielectric material has a dielectric constant of about 321, a dissipation factor of about 0.001, and exhibited tuning of about 28%, while exhibiting leakage of no more than about 3 micro amps after 45 hrs, as shown in Table 4.

The tunable dielectric material composition comprising the low dielectric loss glass additive and dielectric powder as shown in Example 3 of Table 3 was pressed into a 1 inch diameter cylinder about 0.3 inch in height and sintered in a firing cycle of about 30 hours in length with a peak temperature of 1,100° C. and then machined to a uniform height of about 0.15 inch. The resultant dielectric material has a dielectric constant of about 228, a dissipation factor of about 0.001, and exhibited tuning of about 23%, while exhibiting leakage of no more than about 3 micro amps after 45 hrs, as shown in Table 4.

The tunable dielectric material composition comprising the low dielectric loss glass additive and dielectric powder as shown in Example 4 of Table 3 was pressed into a 1 inch diameter cylinder about 0.3 inch in height and sintered in a firing cycle of about 30 hours in length with a peak temperature of 1,100° C. and then machined to a uniform height of about 0.15 inch. The resultant dielectric material has a dielectric constant of about 265, a dissipation factor of about 0.001, and exhibited tuning of about 31%, while exhibiting leakage of less than about 3 micro amps after 50 hrs, as shown in Table 4.

The tunable dielectric material composition comprising the low dielectric loss glass additive and dielectric powder as shown in Example 5 of Table 3 was pressed into a 1 inch diameter cylinder about 0.3 inch in height and sintered in a firing cycle of about 30 hours in length with a peak temperature of 1,100° C. and then machined to a uniform height of about 0.15 inch. The resultant dielectric material has a dielectric constant of about 272, a dissipation factor of about 0.001, and exhibited tuning of about 33%, while exhibiting leakage of less than about 3 micro amps after 50 hrs, as shown in Table 4.

The tunable dielectric material composition comprising the low dielectric loss glass additive and dielectric powder as shown in Example 6 of Table 3 was pressed into a 1 diameter cylinder about 0.3 inch in height and sintered in a firing cycle of about 30 hours in length with a peak temperature of 1,100° C. and then machined to a uniform height of about 0.15 inch. The resultant dielectric material has a dielectric constant of about 217, a dissipation factor of about 0.001, and exhibited tuning of about 29%, while exhibiting leakage of less than about 3 micro amps after 50 hrs, as shown in Table 4.

A thick film dielectric ink composition comprising the low dielectric loss glass additive and tunable dielectric powder finely dispersed in an organic binder, as shown in Table 5, Example 7, was printed using standard thick film processes onto a MgO substrate and fired in a 30 Hr firing cycle having a peak temperature of 1,100° C., and then thin film metallized with a gold electrode to form a varactor having exhibited tuning of about 43%, as shown in Table 6.

A thick film dielectric ink composition comprising the low dielectric loss glass additive and tunable dielectric powder, finely dispersed in an organic binder, as shown in Table 5, Example 7, was printed using standard thick film processes onto a YSZ substrate and fired in a 30 Hr firing cycle having a peak temperature of 1,100° C., and then thin film metallized with a gold electrode to form a varactor having exhibited tuning of about 19%, as shown in Table 6.

A thick film dielectric ink composition comprising the low dielectric loss glass additive and tunable dielectric powder finely dispersed in an organic binder, as shown in Table 5, Example 7, was printed using standard thick film processes onto a 99.6% alumina substrate and fired in a 30 Hr firing cycle having a peak temperature of 1,100° C., and then thin film metallized with a gold electrode to form a varactor having exhibited tuning of about 24%, as shown in Table 6.

A thick film dielectric ink composition comprising the low dielectric loss glass additive and tunable dielectric powder finely dispersed in an organic binder, as shown in Table 5, Example 7, was then printed using standard thick film processes onto a 96% alumina substrate and fired in a 30 Hr firing cycle having a peak temperature of 1,100° C., and then thin film metallized with a gold electrode to form a varactor having exhibited tuning of about 10%, as shown in Table 6.

TABLE 5

| Composition | Example 7 |
| --- | --- |
| Organic Binder | 35.00% |
| Low Dielectric Loss Glass #7 | 3.25% |
| Dielectric Powder F | 61.75% |
| Total | 100.00% |

TABLE 6

1100° C. Peak Sintering Temperature, 30 Hour Cycle

| Substrate | % Tuning |
| --- | --- |
| MgO | 43 |
| YSZ | 19 |
| 99.6% Alumina | 24 |
| 96% Alumina | 10 |

A thick film dielectric ink composition comprising the low dielectric loss glass additive and tunable dielectric powder finely dispersed in an organic binder, as shown in Table 7, Example 8, was printed using standard thick film processes onto a MgO substrate and fired in a 30 Hr firing cycle having a peak temperature of 1,100° C., and then thin film metallized with a gold electrode to form a varactor having exhibited tuning of about 43%, as shown in Table 8.

A thick film dielectric ink composition comprising the low dielectric loss glass additive and tunable dielectric powder finely dispersed in an organic binder, as shown in Table 7, Example 8, was printed using standard thick film processes onto a 96% alumina substrate and fired in a 3Hr firing cycle having a peak temperature of 900° C., and then thin film metallized with a gold electrode to form a varactor having exhibited tuning of about 0.5%, as shown in Table 8.

TABLE 7

|  | Example 8 |
| --- | --- |
| Organic Binder | 35.00% |
| Low Dielectric Loss Glass #7 | 13.98% |
| Dielectric Powder C | 51.02% |
| Total | 100.00% |

TABLE 8

| Firing | % Tuning | |
|---|---|---|
| | MgO | 96% Alumina |
| 1100° C. Peak, 30 Hour Cycle | 1.5 | — |
| 900° C. Peak, 3 Hour Cycle | — | 0.5 |

A thick film dielectric ink composition comprising the low dielectric loss glass additive and tunable dielectric powder finely dispersed in an organic binder, as shown in Table 9, Example 9, was printed using standard thick film processes onto a MgO substrate and fired in a 30 Hr firing cycle having a peak temperature of 1,100° C., and then thin film metallized with a gold electrode to form a varactor. The varactor exhibited dielectric constants of 280 at 0 volts and 180 at 300 volts with loss tangents of 0.00132 at 0 volts and 0.018 at 300 volts with exhibited tuning of about 30%, as shown in Table 10.

A thick film dielectric ink composition comprising the low dielectric loss glass additive and tunable dielectric powder finely dispersed in an organic binder, as shown in Table 9, Example 10, was printed using standard thick film processes onto a MgO substrate and fired in a 30 Hr firing cycle having a peak temperature of 1,100° C., and then thin film metallized with a gold electrode to form a varactor. The varactor exhibited dielectric constants of 200 at 0 volts and 140 at 300 volts with loss tangents of 0.00116 at 0 volts and 0.0156 at 300 volts with exhibited tuning of about 27%, as shown in Table 10.

A thick film dielectric ink composition comprising the low dielectric loss glass additive and tunable dielectric powder finely dispersed in an organic binder, as shown in Table 9, Example 11, was printed using standard thick film processes onto a MgO substrate and fired in a 30 Hr firing cycle having a peak temperature of 1,100° C., and then thin film metallized with a gold electrode to form a varactor. The varactor exhibited dielectric constants of 440 at 0 volts and 240 at 300 volts with loss tangents of 0.0126 at 0 volts and 0.0197 at 300 volts with exhibited tuning of about 40%, as shown in Table 10.

A thick film dielectric ink composition comprising the low dielectric loss glass additive and tunable dielectric powder finely dispersed in an organic binder, as shown in Table 9, Example 12, was printed using standard thick film processes onto a MgO substrate and fired in a 30 Hr firing cycle having a peak temperature of 1,100° C., and then thin film metallized with a gold electrode to form a varactor. The varactor exhibited dielectric constants of 300 at 0 volts and 170 at 300 volts with loss tangents of 0.0129 at 0 volts and 0.0183 at 300 volts with exhibited tuning of about 37%, as shown in Table 10.

A thick film dielectric ink composition comprising the low dielectric loss glass additive and tunable dielectric powder finely dispersed in an organic binder, as shown in Table 9, Example 13, was printed using standard thick film processes onto a MgO substrate and fired in a 30 Hr firing cycle having a peak temperature of 1,100° C., and then thin film metallized with a gold electrode to form a varactor. The varactor exhibited dielectric constants of 360 at 0 volts and 180 at 300 volts with loss tangents of 0.015 at 0 volts and 0.0198 at 300 volts with exhibited tuning of about 43%, as shown in Table 10.

TABLE 9

| Composition | Example 9 | Example 10 | Example 11 | Example 12 | Example 13 |
|---|---|---|---|---|---|
| Organic Binder | 35.00% | 35.00% | 35.00% | 35.00% | 35.00% |
| Low Dielectric Loss Glass #7 | 3.25% | 3.25% | 3.25% | 3.25% | 3.25% |
| Dielectric Powder B | 61.75% | — | — | — | — |
| Dielectric Powder C | — | 61.75% | — | — | — |
| Dielectric Powder D | — | — | 61.75% | — | — |
| Dielectric Powder E | — | — | — | 61.75% | — |
| Dielectric Powder F | — | — | — | — | 61.75% |
| Total | 100.00% | 100.00% | 100.00% | 100.00% | 100.00% |

TABLE 10

| | K @ 0 volts | K @ 300 volts | Tan δ, 0 volts | Tan δ, 0 volts | Tuning |
|---|---|---|---|---|---|
| Example 9 | 280 | 180 | 0.0132 | 0.018 | 30.20% |
| Example 10 | 200 | 140 | 0.0116 | 0.0156 | 26.60% |
| Example 11 | 440 | 240 | 0.0126 | 0.0197 | 39.90% |
| Example 12 | 300 | 170 | 0.0129 | 0.0183 | 36.70% |
| Example 13 | 360 | 180 | 0.015 | 0.0198 | 42.50% |

A thick film dielectric ink composition comprising the low dielectric loss glass additive and tunable dielectric powder finely dispersed in an organic binder, as shown in Table 11, Example 14, was printed using standard thick film processes onto a 96% alumina substrate and fired in a 30 Hr firing cycle having a peak temperature of 1,100° C., and then thin film metallized with a gold electrode to form a varactor. The varactor exhibited tuning of about 0.25%, as shown in Table 12.

A thick film dielectric ink composition comprising the low dielectric loss glass additive and tunable dielectric powder finely dispersed in an organic binder, as shown in Table 11, Example 15, was printed using standard thick film processes onto a MgO substrate and fired in a 3 Hr firing cycle having a peak temperature of 1,100° C., and then thin film metallized with a gold electrode to form a varactor. The varactor exhibited tuning of about 2%, as shown in Table 12.

TABLE 11

| Composition | Example 14 | Example 15 |
|---|---|---|
| Organic Binder | 35.00% | 35.00% |
| Low Dielectric Loss Glass #7 | 13.98% | 3.25% |
| Dielectric Powder H | 51.02% | 61.75% |
| Total | 100.00% | 100.00% |

TABLE 12

| Firing | % Tuning | |
|---|---|---|
| | Example 15 96% Alumina | Example 15 MgO |
| 1100° C. Peak, 30 Hour Cycle | 0.25 | — |
| 1100° C. Peak, 3 Hour Cycle | — | 2.2 |

Additional ink compositions were made from the tunable dielectric powders and glass additives listed in Table 13. The materials were fired at 1,100° C. and their properties were measured in coplanar structures with a 20 micron gap between adjacent conductors having lengths of 30 mils, as shown in Table 13.

TABLE 13

Tunable Dielectric/Glass Additive Compositions at 2 GHz

| Example | Tunable Dielectric Powder | Glass Frit | % Solids | Frit as % of Solids | Composite 20 um Gap/Wf30 Data @ 2 GHz | | | | | |
|---|---|---|---|---|---|---|---|---|---|---|
| | | | | | Cp-0 V | Tan d, 0 volts | Tan d, 300 volts | % Tuning | Q-0 V | Q-300 V |
| 16 | A | 7 | 65 | 5 | 0.587 | 0.0149 | 0.0217 | 27.0 | 67.0 | 46.0 |
| 17 | A | 6 | 65 | 5 | 0.517 | 0.0134 | 0.0270 | 29.8 | 74.8 | 37.0 |
| 18 | A | 5 | 65 | 5 | 0.672 | 0.0128 | 0.0270 | 32.3 | 78.0 | 37.0 |
| 19 | A | 10 | 65 | 5 | 0.710 | 0.0746 | 0.0565 | 35.3 | 13.4 | 17.7 |
| 20 | A | 9 | 65 | 5 | 0.772 | 0.0546 | 0.0467 | 35.6 | 18.3 | 21.4 |
| 21 | A | 8 | 65 | 5 | 0.747 | 0.0513 | 0.0446 | 36.3 | 19.5 | 22.4 |
| 22 | A | 11 | 65 | 5 | 0.591 | 0.0136 | 0.0262 | 28.7 | 73.5 | 38.2 |
| 23 | A | 12 | 65 | 5 | 0.518 | 0.0146 | 0.0253 | 29.3 | 68.7 | 39.6 |
| 24 | A | 4 | 65 | 5 | 0.531 | 0.0153 | 0.0234 | 22.9 | 65.3 | 42.8 |
| 25 | A | 3 | 65 | 5 | 0.561 | 0.0165 | 0.0279 | 28.6 | 60.5 | 35.8 |
| 26 | A | 2 | 65 | 5 | 0.484 | 0.0162 | 0.0275 | 25.5 | 61.9 | 36.4 |
| 27 | A | 1 | 65 | 5 | 0.596 | 0.0155 | 0.0256 | 25.0 | 64.5 | 39.0 |
| 28 | I | 7 | 58 | 5 | 0.871 | 0.0170 | 0.0292 | 42.3 | 58.7 | 34.3 |
| 29 | J | 7 | 58 | 5 | 0.866 | 0.0137 | 0.0288 | 42.1 | 73.1 | 34.7 |
| 30 | K | 7 | 58 | 5 | 0.985 | 0.0177 | 0.0300 | 47.0 | 56.4 | 33.3 |
| 31 | I | 11 | 58 | 5 | 0.861 | 0.0299 | 0.0361 | 48.0 | 33.5 | 27.7 |
| 32 | I | 12 | 58 | 5 | 0.972 | 0.0290 | 0.0344 | 51.0 | 34.5 | 29.1 |
| 33 | G | 6 | 65 | 5 | 0.546 | 0.0694 | 0.0515 | 39.0 | 14.4 | 19.4 |
| 34 | G | 5 | 65 | 5 | 0.777 | 0.0730 | 0.0526 | 42.6 | 13.7 | 19.0 |

In accordance with an embodiment of the present invention, a multilayer package can be made by adding metallization and interconnections to each layer independently, and then laminating the layers together. By using a tunable dielectric material, the component of a tunable package can be realized. This structure can be sintered at relatively low temperatures into a monolithic part. The number of layers of tunable material versus nontunable material or different tunable material can vary. By producing a multilayer structure, a material can be engineered to have very low loss properties along with tunable properties. It is also possible to produce a graded structure. Discrete parts can be produced in a package to provide high density interconnections associated with a multilayer package combined with the tunable dielectric material. Components such as discrete phase shifters in an antenna can then be placed all in a single package.

Low temperature cofired ceramics (LTCC) may be produced in accordance with the present invention. This type of package can be made from films of the present tunable dielectric materials and screen printed inks. The components of the package are all fired at relatively low temperatures, e.g., less than 1,000° C. With glass additions to the tunable dielectric powders in amounts of from about 0.5 to about 60 weight percent, typically from about 1–10 weight percent, it is possible to produce dense tunable ceramic plates. High temperature co-fired ceramic (HTCC) packages may be produced.

FIG. 1 is a partially schematic side sectional view illustrating a tunable varactor 10 comprising a thin film gold edge-around to backside groundplane. The varactor 10 includes a substrate 12, which may comprise 99.6 weight percent alumina or the like. A film of the present tunable dielectric material 14 is deposited on the substrate 12. A backside groundplane 16 made of a noble metal such as Au, Ag, Pd—Ag, or Pt—Ag is printed on the back of the substrate 12. A thin film gold metallization layer 18 is deposited on the substrate 12 over a portion of the tunable dielectric film 14. The metallization layer 18 wraps around an edge of the substrate 12 and contacts the groundplane 16. The varactor 10 shown in FIG. 1 may be fabricated by printing the tunable dielectric film 14 on the substrate 12, firing at 1,000° C. or 1,100° C., printing the backside groundplane 16 on the substrate 12, firing at 850° C.–900° C., and then depositing the thin film gold metallization layer 18.

FIG. 2 is a partially schematic side sectional view of a tunable varactor 20 comprising a thick film via to thick film backside groundplane. The tunable varactor 20 includes a substrate 12 made of a material such as 99.6 weight percent alumina. The tunable dielectric film 14 is deposited on the substrate 12. The backside groundplane 16 is printed on the back of the substrate 12. The thin film gold metallization layer 18 is deposited on the substrate 12 over a portion of the tunable dielectric film 14. A via 22 extends through the substrate 12 and electrically connects the groundplane 16 and the metallization layer 18. The tunable varactor 20 shown in FIG. 2 may be fabricated by printing the tunable dielectric film 14 on the substrate 12, firing at 1,100° C., printing and pulling through the via 22, firing at 850–900° C., printing the backside groundplane 16, firing at 850–900° C., and then depositing the thin film gold metallization layer 20.

FIG. 3 is a partially schematic side view of a tunable varactor 30 on a low loss LTCC with integral groundplane. The tunable varactor 30 includes a groundplane 16 sandwiched between insulator ceramic layers 32 and 34 to thereby form a low temperature cofired ceramic (LTCC)

structure. The layers 32 and 34 may be made of a material such as a low loss LTCC dielectric tape sold under the designation Heraeus CT2000. The tunable dielectric film 14 is printed on the insulating ceramic layer 32. The metallization layer 18 covers part of the tunable dielectric film 14 and part of the layer 32. A via 22 electrically connects the groundplane 16 to the metallization layer 18 through the insulating ceramic layer 32. The tunable varactor 30 may be fabricated by punching a via hole through the low loss LTCC layer 32, filling the via 22, printing the groundplane 16, collating, stacking and laminating the groundplane 16 and low loss LTCC layers 32 and 34, co-firing the laminated layers at 925° C., printing the tunable dielectric film 14, firing at about 925° C., and depositing the thin film metallization layer 18.

FIG. 4 is a partially schematic side sectional view of a tunable varactor 40 with an integral groundplane. The tunable varactor 40 includes a substrate 12, such as alumina, having a groundplane 16 deposited thereon. A thick film low loss dielectric layer 42 is deposited on the groundplane 16. The thick film low loss dielectric layer 42 may be made of any suitable material such as a low loss insulating dielectric ink sold under the designation Heraeus IP9117D or DuPont QM44. The tunable dielectric film 14 is deposited on the thick film 42. The via 22 electrically connects the groundplane 16 and metallization layer 18 through the layer 42. The tunable varactor 40 may be fabricated by printing and firing the noble metal groundplane 16 on the substrate 12, printing and firing the low loss dielectric layer 42 in one or more steps, printing and firing the via 22, printing the tunable dielectric film 14, firing at a temperature of about 900° C. and depositing the thin film gold metallization layer 18.

FIG. 5 is a partially schematic side sectional view of a tunable varactor 50 on a combined substrate and groundplane. The tunable varactor 50 includes a combined substrate/groundplane 52 made of a material such as 430 stainless steel. A thick film insulator dielectric layer 54 is deposited on the substrate/groundplane 52. The thick film insulator dielectric layer 54 may be made of any suitable material such as an insulating thick film dielectric ink sold under the designation DuPont 3500N, ESL 4914 or Heraeus SD 1000. The layer 54 may have a coefficient of thermal expansion that is matched to the CTE of the substrate/groundplane 52, e.g., a coefficient of thermal expansion of about 10 for a 430 stainless steel substrate/groundplane. A thick film low loss dielectric layer 56 is deposited on the layer 54. The thick film low loss dielectric layer 56 may be made of any suitable material such as a low loss insulating dielectric ink sold under the designation Heraeus IP9117D or DuPont QM44, and may have a coefficient of thermal expansion of about 6.7. A via 22 is formed through the layers 54 and 56. The tunable dielectric film 14 is deposited on the thick film low loss dielectric layer 56. The thin film gold metallization layer 18 covers portions of the thick film low loss dielectric layer 56 and the tunable dielectric film 14. The tunable varactor 50 shown in FIG. 5 may be fabricated by printing and firing the thick film insulator dielectric layer 54 on the substrate/groundplane 52, printing and firing the thick film low loss dielectric layer 56 on the layer 54 in one or more steps, printing and firing the via 22, printing the tunable dielectric film 14, firing at a temperature of 900° C., and depositing the thin film gold metallization layer 18.

FIG. 6 is a partially schematic side sectional view of a tunable varactor 60. The tunable varactor 60 includes a combined substrate and groundplane 62 made of a material such as 430 stainless steel. The substrate/groundplane 62 includes mounting hole 63. A thick film insulator dielectric layer 64 having a CTE of about 10 is deposited on the substrate/groundplane 62. A thick film low loss dielectric layer 66 having a CTE of about 6.7 is deposited on the layer 64. A via 22 is provided through the layers 64 and 66. The tunable dielectric film 14 and thin film gold metallization layer 18 are deposited on the thick film low loss dielectric layer 66. An overmold package 68 encases the dielectric layers. The tunable varactor 60 shown in FIG. 6 may be fabricated by printing and firing the thick film insulator dielectric layer 64 on the substrate/groundplane 62, printing and firing the thick film low loss dielectric layer 66 in one or more steps, printing and firing the via 22, printing the tunable dielectric film 14, firing at 900° C., depositing the thin film gold metallization layer 18, and encasing the various layers in the overmold package 68.

FIG. 7 is a partially schematic side sectional view of a tunable varactor 70 comprising a two-sided package. The layers of the tunable varactor 70 shown in FIG. 7 are similar to those of the tunable varactor 60 shown in FIG. 6, with the addition of a via 72, a thick film insulator dielectric layer 74, a thin film gold metallization layer 76, and a surface mountable device and/or ball grid array component (SMD/BGA) 78 provided on the backside of the substrate/groundplane 62. The SMD/BGA component 78 may comprise common or commodity chip resistors, chip capacitors, resistor networks, inductor packages or the like. The tunable varactor 70 shown in FIG. 7 may be fabricated by printing and firing the insulator layers 64 and 74 on opposite sides of the substrate/groundplane 62, printing and firing the thick film low loss dielectric layer 66 in one or more steps, depositing and firing the vias 62 and 72, printing the tunable dielectric film 14, firing at 900° C., depositing the thin film gold metallization layers 18 and 76, mounting the SMT/BGA components, and encasing the layers in the overmold package 79.

The present invention provides several advantages. Decreased sintering temperatures allow for the use of cheaper and more conventional substrates, the use of conventional thick film lower sintering temperature metallization materials and techniques, easier integration onto single substrate vertical structures for voltage reduction and LTCC packages, and multi-layered structures with other lower sintering materials. Better microwave properties are provided for building components with lower loss, lower dielectric constants, good tunability, better temperature stability, better breakdown strength, improved life, and reduced voltages due to the ability to form vertical structures. Improved surface roughness and uniformity provide better breakdown strength, allow for higher fields to be placed on the ceramic, provide improved life due to smoothness (uniformity of field), and allow for definition of smaller gaps (starts to approach a thin film).

Whereas particular embodiments of this invention have been described above for purposes of illustration, it will be evident to those skilled in the art that numerous variations of the details of the present invention may be made without departing from the invention as defined in the appended claims.

What is claimed is:

1. A tunable dielectric material comprising:
  a tunable dielectric ceramic; and
  a low loss glass additive.

2. The tunable dielectric material of claim 1, wherein the low loss glass additive comprises boron-containing glass, calcium-containing glass and/or aluminum-containing glass.

3. The tunable dielectric material of claim 1, wherein the low loss glass additive comprises B and at least one other element selected from Si, Al, Li, Na, K, Ba, Zn, Mn and Ca.

4. The tunable dielectric material of claim 1, wherein the low loss glass additive comprises Ca and at least one other element selected from B, Al, Si, Ba, Zn, Li, Mn and Sr.

5. The tunable dielectric material of claim 1, wherein the low loss glass additive comprises Al and at least one other element selected from Si, B, Li, Na, K, Ba, Zn, Mn, Ca, Sr and Mg.

6. The tunable dielectric material of claim 1, wherein the low loss glass additive comprises borosilicate glass.

7. The tunable dielectric material of claim 1, wherein the low loss glass additive comprises lithia potash borosilicate glass.

8. The tunable dielectric material of claim 1, wherein the low loss glass additive comprises B, Ca and Al.

9. The tunable dielectric material of claim 1, wherein the low loss glass additive comprises from about 0.1 to about 60 weight percent of the material.

10. The tunable dielectric material of claim 1, wherein the low loss glass additive comprises from about 0.1 to about 25 weight percent of the material.

11. The tunable dielectric material of claim 1, wherein the low loss glass additive comprises from about 0.5 to about 15 weight percent of the material.

12. The tunable dielectric material of claim 1, wherein the low loss glass additive comprises at least about 2 weight percent of the material.

13. The tunable dielectric material of claim 1, wherein the low loss glass additive comprises at least about 3 weight percent of the material.

14. The tunable dielectric material of claim 1, wherein the low loss glass additive has a dielectric loss of less than about 0.003 at a frequency of 2 GHz.

15. The tunable dielectric material of claim 1, wherein the tunable dielectric ceramic is selected from barium strontium titanate, barium titanate, strontium titanate, barium calcium titanate, barium calcium zirconium titanate, lead titanate, lead zirconium titanate, lead lanthanum zirconium titanate, lead niobate, lead tantalate, potassium strontium niobate, sodium barium niobate/potassium phosphate, potassium niobate, lithium niobate, lithium tantalate, lanthanum tantalate, barium calcium zirconium titanate, sodium nitrate, and combinations thereof.

16. The tunable dielectric material of claim 1, wherein the tunable dielectric ceramic comprises barium strontium titanate.

17. The tunable dielectric material of claim 1, wherein the material further comprises a non-tunable dielectric ceramic comprising a metal oxide.

18. The tunable dielectric material of claim 1, wherein the material further comprises a non-tunable dielectric ceramic comprising a metal silicate.

19. The tunable dielectric material of claim 1, wherein the material further comprises at least one non-tunable dielectric ceramic comprising MgO, MgAl2O4, MgTiO3, Mg2SiO4, CaSiO3, MgSrZrTiO6, CaTiO3, Al2O3, SiO2, BaSiO3, SrSiO3, MgAl2O4, WO3, SnTiO4, ZrTiO4, CaSnO3, CaWO4, CaZrO3, MgTa2O6, MgZrO3, MnO2, PhO, Bi2O3 and/or La2O3.

20. The tunable dielectric material of claim 1, wherein the material further comprises at least one non-tunable dielectric ceramic comprising Mg2SiO4, CaSiO3, BaSiO3, SrSiO3, MgO, CaTiO3, MgZrSrTiO6, MgTiO3, MgAl2O4, MgTa2O6 and/or MgZrO3.

21. The tunable dielectric material of claim 1, wherein the tunable dielectric ceramic comprises barium strontium titanate and the low loss glass additive comprises B and at least one element selected from Ca, Al and Si.

22. The tunable dielectric material of claim 21, wherein the material further comprises at least one non-tunable dielectric ceramic comprising a metal oxide or a metal silicate.

23. The tunable dielectric material of claim 22, wherein the non-tunable dielectric ceramic comprises Mg2SiO4, CaSiO3, BaSiO3, SrSiO3, MgO, CaTiO3, MgZrSrTiO6, MgTiO3, MgAl2O4, MgTa2O6 and/or MgZrO3.

24. The tunable dielectric material of claim 1, wherein the material has a microwave loss of less than about 0.08 at a frequency of 2 GHz.

25. The tunable dielectric material of claim 1, wherein the material has a tunability of at least 5 percent at 4 V/micron.

26. The tunable dielectric material of claim 1, wherein the material has a breakdown strength of at least about 80 V/micron thickness.

27. The tunable dielectric material of claim 1, wherein the material has a sintering temperature of less than 1,200° C.

28. The tunable dielectric material of claim 1, wherein the material has a sintering temperature of less than 1,100° C.

29. The tunable dielectric material of claim 1, wherein the material has a sintering temperature of less than 1,000° C.

30. A tunable device comprising:
   a substrate; and
   a tunable dielectric material deposited on the substrate, wherein the tunable dielectric material comprises a low loss glass additive.

31. The tunable device of claim 30, wherein the substrate comprises alumina, fosterite, zirconia or insulated metal.

* * * * *